June 21, 1960 G. E. PORTER 2,941,366
ASSISTER UNIT FOR HYDRAULIC CONTROL SYSTEM
Filed Nov. 19, 1956
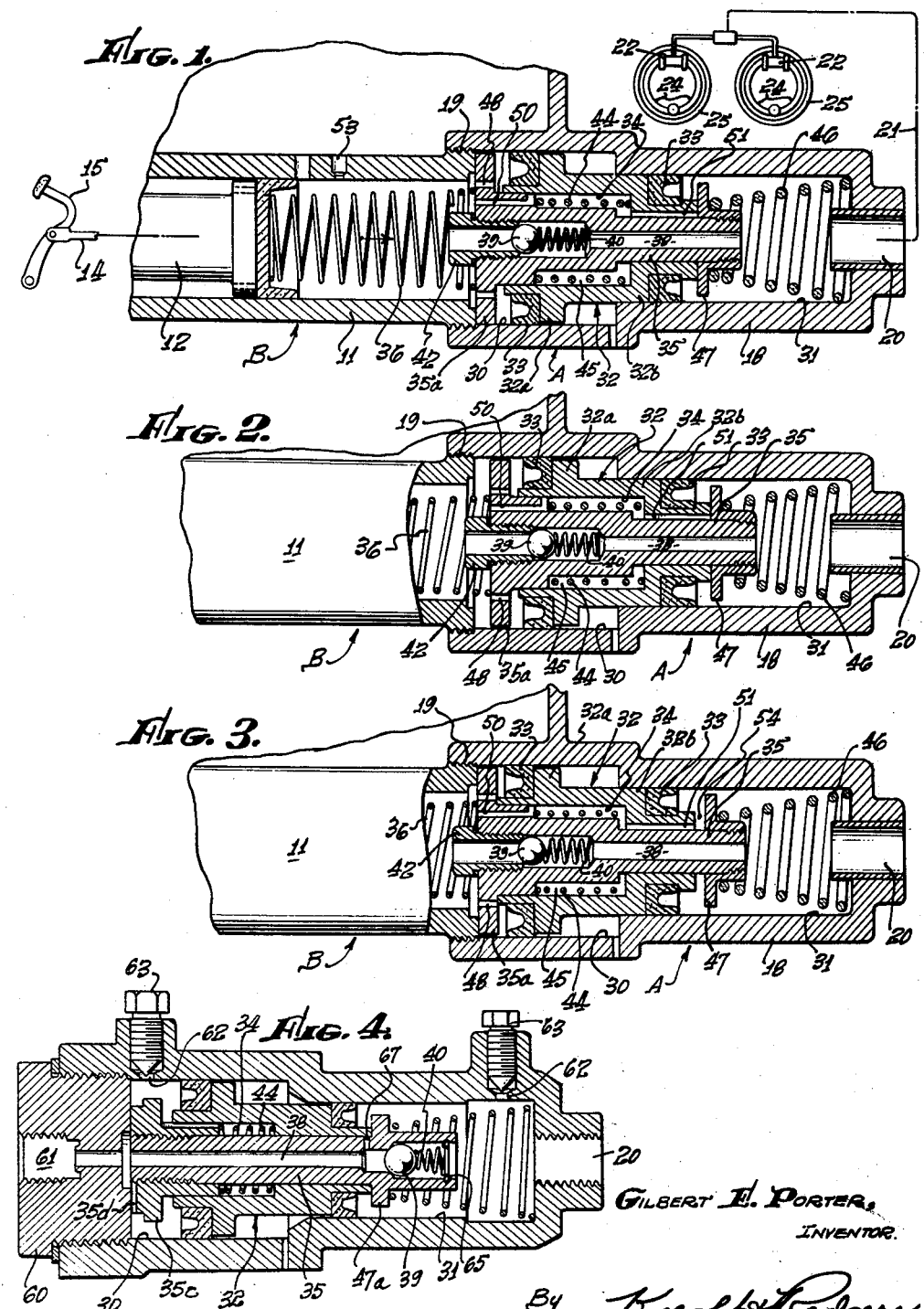
Gilbert E. Porter,
INVENTOR.
By Knight & Rodgers
ATTORNEYS.

United States Patent Office 2,941,366
Patented June 21, 1960

2,941,366

ASSISTER UNIT FOR HYDRAULIC CONTROL SYSTEM

Gilbert E. Porter, 244 E. 4th St., Escondido, Calif.

Filed Nov. 19, 1956, Ser. No. 622,849

8 Claims. (Cl. 60—54.6)

The present invention relates generally to hydraulic control systems, and more particularly to an assister unit which can be placed in the hydraulic control system for the purpose of increasing the ultimate fluid pressure developed. Since the present invention has been designed primarily for an automobile brake system, it is shown and described in this connection as illustrative of the invention; but in its broader aspect, my invention is not necessarily limited to this specific application.

Most automobile drivers recognize that it is difficult to obtain under some circumstances the high degree of control of application of the brakes which may be desired. A particular difficulty frequently observed is that of maintaining maximum pressure or braking force in the system over an appreciable interval time without the use of some power unit designed to apply a part or all of the operating force. The initial thrust upon the foot pedal can be quite vigorous and is ordinarily adequate to give a hard application of the brakes. Because of the momentum of the parts and because it is possible to obtain a relatively strong thrust for a short time, a very high fluid pressure may be initially built up in the brake system and as a result the maximum output for applying the brake shoes is developed. If it is desired to maintain this maximum condition for a long time, the automobile driver may encounter considerable difficulty in doing so because of muscular fatigue. The continuing increase in weight of the vehicles and the average speed at which they are normally operated creates a corresponding increase in the work which the brakes are called upon to do in stopping a vehicle. This is particularly true in the case of commercial vehicles in which the brakes are applied by an hydraulic system.

These conditions have brought about the need for larger and heavier brake units and a corresponding increase in the operating pressures in the hydraulic system, which in turn require a greater exertion by the operator to achieve and maintain a maximum thrust on the brake pedal over an extended interval of time. If maximum pressure in the hydraulic system can be maintained more easily and with less physical exertion, a greater margin of safety is afforded drivers, especially women, who otherwise are unable to actuate the vehicle brakes as vigorously as may be required under some circumstances.

Thus it becomes a general object of my invention to provide an improved design for an assister unit which may be incorporated in the conventional control systems for vehicle brakes in order to provide for easier control and maintenance of high braking pressures in the system.

Another object of the present invention is to maintain an initial hydraulic pressure within the system in order to take up the slack between the parts of the brakes and improve the operation of them, especially when for any reason clearance between the drums and the shoes increases or wear takes place in other parts of the system.

Another object is to provide an assister of the character described which may be built as a self contained unit that may be added to the existing brake system of an automobile as an accessory or attachment without interfering with the proper operation of the brake system.

These objects have been attained in an assister unit of novel construction embodying my invention. The unit includes a housing having an inlet adapted to be connected to a source of fluid under pressure, typically the master cylinder of an hydraulic brake system, and an outlet which is adapted to be connected to a motor device, typically the brake cylinders of the system. The housing is provided with an internal bore having two sections of different diameters and adapted to receive a differential piston which is movable within the housing in the internal bore. The piston has two end faces of different effective areas, the face of larger area being in communication with the inlet to the housing and the face of smaller area being in communication with the outlet of the housing.

A fluid passage extends through the differential piston to establish fluid communication between the spaces within the housing at either end of the piston and thus permit fluid flow between the inlet and the outlet of the housing. A check valve is located in the fluid passage. This valve is normally closed and is so disposed as to close the fluid passage to fluid flow from the outlet toward the inlet; but the check valve opens in response to a higher fluid pressure applied through the housing inlet than exists at the outlet side of the piston. A second fluid passage is also provided, the second fluid passage serving as a by-pass around the check valve so that when the second passage is open, fluid can flow through the passage from the outlet side to the inlet side of the piston even though the first mentioned check valve is closed. Fluid flow through the second passage is controlled by a second valve means which is normally closed but which is opened in response to the existence of a predetermined higher fluid pressure at the outlet side of the differential piston in order to permit flow through the piston in the reversed direction. This flow permits the brakes to be released by relieving pressure on fluid at the outlet side of the unit when fluid pressure at the inlet side of the piston is reduced by reducing the pressure applied through the brake pedal. Also, fluid in the brake lines can pass through the assister back to the master cylinder.

How the above and other objects and advantages of my invention, as well as others not specifically mentioned herein, are attained will be more readily understood by reference to the following description and to the annexed drawing, in which:

Fig. 1 is a longitudinal median section through a brake assister of my novel design combined with a master cylinder and fluid reservoir into a single unit, the parts being shown in the normal position occupied when the brakes are released;

Fig. 2 is a view similar to Fig. 1 showing the position of the parts during application of the brakes when high fluid pressure is being developed in the control system;

Fig. 3 is a view similar to Fig. 1 showing the position of the parts while pressure in the system is being reduced and the brakes released; and Fig. 4 is a longitudinal median section through a variation form of my invention which is built as an independent unit which can be incorporated in an already existing brake system.

Referring now to Fig. 1, the assister unit constituting a preferred embodiment of my invention is generally indicated at A. In this form of the invention it is combined into a unitary structure with the housing of the master cylinder and reservoir indicated generally at B, the inlet end of the assister being connected directly to the outlet end of the master cylinder. The master cylinder and its reservoir may be of any conventional construction and they are shown only in fragmentary form in the drawings because their construction does not need detailed illustration. The master cylinder comprises cylinder 11 within which reciprocates piston 12. The piston is actuated by a piston rod 14 which is connected to brake pedal 15 in a well-known manner.

The assister A has a housing indicated generally at 18 which at one end is open and threaded at 19 to receive the end of master cylinder 11. This open end of the assister housing is the inlet end and is adapted to receive fluid under pressure delivered to it by the master cylinder as a result of the movement of piston 12 towards the right. At the other end the assister housing has an outlet 20. Fluid under pressure is delivered from the assister A through fluid outlet 20 and conduit 21 which connects the housing outlet to one or more fluid motors 22. Although the motors 22 may be of any suitable type and design and may be connected operatively to other types of apparatus, in order to illustrate the invention the motors are here shown as operating brake shoes 24 which are expanded by the fluid motors into engagement with brake drums 25.

Considering now the construction of the assister A it will be seen that housing 18 is provided with an internal bore having two concentric sections 30 and 31 which have different diameters, the bore 30 being larger than the bore 31. Slidably mounted within this bore is differential piston 32 which is provided with a large diameter portion 32a which slides axially within the larger bore 30 and a small diameter portion 32b which slides within the smaller bore 31. These two portions of the piston are provided with packing rings at 33 to effect a fluid tight seal between the piston and the walls of housing 18. The two ends of the piston provide spaced faces which have different effective areas exposed to fluid pressure. The face of larger area is that exposed to fluid pressure within bore 30 and in fluid communication with the inlet end of housing 18. The face of smaller effective area is that exposed to fluid pressure within bore 31 and in communication with outlet 20 from housing 18.

Differential piston 32 is provided with a central bore 34 which extends longitudinally of the piston from end to end. The bore has two sections of different diameters. Slidably mounted within this bore is hollow stem 35 which has two sections of different diameters corresponding to the two sections of bore 34. At one end stem 35 has an integral flange of substantially the diameter of bore 30 and which engages the end of cylinder 11, as will be explained more fully. The return spring 36 of the master cylinder bears against this same end of the stem, the other end of spring 36 bearing against piston 12 in order to return the piston to the left when the brakes are released. Differential piston 32 is capable of limited movement relative to stem 35 as will be explained later; but during the pressure multiplying or compounding stage they act as a unitary structure. They are collectively referred to herein as the piston assembly in describing their combined action or effect.

Stem 35 has a central axially extending fluid passage 38 which extends entirely through the stem. Within the passage is located a check valve 39 consisting of a ball which is held against a seat by spring 40. The seat is provided on the inner end of sleeve 42 which is threaded into one end of stem 35. Sleeve 42 forms a part of passage 38 which provides a fluid passage extending through the piston assembly whereby fluid communication is established between the inlet end of the assister and the outlet end.

Spring 40 normally urges ball 39 against its seat; and in this closed position fluid passage 38 through the piston is closed to fluid flow from outlet 20 towards the inlet end of the assister. However, when the pressure at the inlet end of the piston is greater than that at the outlet end by a small predetermined amount, the excess pressure moves ball 39 away from its seat, compressing spring 40 and allowing fluid communication between the inlet end and the outlet end of the assister.

Internal bore 34 of the differential piston has, at the junction of the two sections of the bore of different diameter, a shoulder against which one end of compression spring 44 bears. Within the larger section of bore 34, stem 35 has a section of smaller diameter that forms an annular space 45 between the stem and the piston body, and spring 44 is in this annular space. The other end of spring 44 bears against a shoulder on stem 35. The force exerted by spring 44 on these two members normally urges piston body toward the right, as viewed in Fig. 1, with respect to the stem. This travel of the piston body is limited by engagement of the end of the piston with annular flange 47 mounted upon the stem in any suitable manner. Here the flange is shown as attached to a threaded collar screwed on to the end of the slide which projects beyond the piston body.

Compression spring 46 bears against the other face of annular flange 47 and against the end of bore 31. It normally urges the piston assembly toward the inlet end of the assister housing. This travel of the piston assembly is limited by engagement of the end face of flange 35a with the end of master cylinder 11. This normal contact between the enlarged end of slide 35 and the end of master cylinder 11 prevents fluid from flowing out of the master cylinder and around flange 35a to enter bore 30. Accordingly, flange 35a is provided with one or more openings 48 extending through the flange which permit fluid and fluid pressure to be freely transmitted from the interior of the master cylinder directly into bore 30 where this fluid can exert pressure on the larger end of the differential piston, without displacing flange 35a from contact with cylinder 11.

A feature of the present invention is provision of means defining a second fluid passage extending through the piston assembly and by passing check valve 39 in the first passage 38. The second fluid passage means in the form of the invention shown in Figs. 1 and 2 is independent of the first fluid passage, although it may be combined therewith, at least in part, as will be explained in connection with a variational form of my invention. In the form of the invention shown in Fig. 1, the second fluid passage has three well defined sections. Starting with the outlet end of the assister unit, the first section consist of passage 50 through the large diameter of the stem. The passage extends from the end of the stem, where it opens to the interior of the master cylinder, forwardly to the shoulder upon which spring 44 bears. Here passage 50 opens into the annular space 45 between the exterior surface of the stem and the internal bore 34 of the differential piston. Forwardly of this annular space is the third section 51 of the fluid passage consisting of a slot or groove cut in the wall of the reduced diameter section of bore 34. This third section 51 may be a hole drilled through a section of the differential piston; or it can also be formed by providing adequate clearance between the reduced diameter portion of the stem and the surrounding bore wall of the differential piston so that the passage is formed between the two members. The illustrated arrangement is preferred as it supports and guides the forward end of the stem and is simple to make.

When the piston assembly is in the rest position, the forward end of passage 51 is closed by engagement of flange 47 with the forward end of the differential piston. Flange 47 serves as a valve to regulate fluid flow through the passage 50—45—51.

Having described the construction of a preferred form of my invention, I shall now describe briefly its operation. To apply the vehicle brakes, pedal 15 is depressed and motion is imparted through connecting rod 14 to piston 12 of the master cylinder to move the piston toward the right in cylinder 11 from the position shown in Fig. 1. As soon as the piston passes port 53 extending between the interior of cylinder 11 and the reservoir, fluid is trapped forwardly of the piston and movement of the piston builds up fluid pressure in the brake system.

During the initial period of brake application there is no movement of the parts of the assister except that ball 39 moves away from its valve seat allowing fluid to flow forwardly through passage 38 from the inlet end of the assister unit to the outlet end. The hydraulic fluid normally fills conduit 21 and fluid motors 22, as will be well understood by persons skilled in the art, so that actual movement of fluid in the system is limited, although fluid flow may be spoken of since there is initially a small amount of fluid passing valve 39. Pressure built up in the fluid in the cylinder 11 is transmitted through the brake line 21 to motors 22 to actuate them. When a pressure of approximately 125 p.s.i. is reached, the shoes 24 have normally been fully expanded into contact with drums 25 and as a result there is no further fluid movement in the system. This point may be reached at a higher or lower pressure than 125 p.s.i.; and this figure is given merely by way of example as being typical of the operation of current brake systems.

Up to this point in the application of the brakes, the brake system has operated in a conventional manner and the assister unit has not come into action. The parts are as shown in Fig. 1 except that valve 39 is open. The assister unit is preferably designed so that it comes into operation at about this pressure. The pressure at which the differential piston starts to act is controlled by the relative diameters of bores 30 and 31 and the strength of spring 46.

During this initial stage so far described, fluid pressure is transmitted through openings 48 to the fluid in bore 30 which is between the forward face of flange 35a and the annular portion of differential piston 32 around stem 35. The force exerted on the piston assembly tending to move it to the right is the product of the area of bore 30 less the area on flange 35a in contact with the end face of cylinder 11 multiplied by the unit fluid pressure. In opposition to and balancing this force to the right is a force to the left, which is made up of two components. One of these components, which is constant or relatively so, is the force exerted on the stem by spring 46. This force is transmitted to the differential piston through engagement of the stem flange 47 with the differential piston. The other force is variable and is the force exerted by fluid in bore 31 against the smaller end of the piston assembly. This force is equal to the diameter of the bore 31 multiplied by the unit fluid pressure therein.

During the initial stage, that is until fluid pressure reaches a predetermined value of approximately 125 p.s.i., more or less, the fluid pressure is equal in bores 30 and 31 because they are in free communication through the first fluid passage 38. As a consequence, the unit fluid pressure applied to the large and small end faces of the piston assembly is the same. However the total force applied to the large end increases more rapidly than that applied to the small end because of the larger effective area of the end which is in communication with the inlet end of the assister. As a consequence, the total force applied to the larger end of the differential piston assembly finally equals and then exceeds the total force applied to the smaller end by the combination of fluid pressure and spring 46.

When this point is reached, spring 46 yields and the piston assembly moves to the right as viewed in Fig. 1. This movement of the assembly causes an increase in the fluid pressure at the small end of the piston. This excess in fluid pressure allows check valve 39 to close against the fluid pressure at the inlet end of the assister. Closing valve 39 completes the initial phase or stage of operation and starts the final or compounding stage in which, because the check valve is closed, the assembly consisting of the differential piston and stem 35 acts as a unit.

Under these conditions, an increase in the force applied to piston 12 increases the unit fluid pressure applied to the larger face of the differential piston. As soon as piston assembly moves even slightly towards the right, flange 35a is moved from engagement with the end of cylinder 11. As a result, the net effective area is increased since the full area of the larger end of the piston assembly is now exposed to fluid pressure generated in the master cylinder 11. This pressure forces the piston assembly to the right and produces in the fluid in bore 31 and brake lines 21 a still higher unit pressure. The unit pressures at opposite ends of the differential piston are approximately inversely proportional to the areas of the two ends of the piston or the cross-sectional areas of bores 30 and 31. Actually the higher pressure in bore 31 is slightly less than this calculated value because of the force applied to the piston by spring 46. This action of a differential piston in producing a higher unit pressure in the fluid in the smaller diameter bore 31 and the brake lines, is commonly referred to in the art as "compounding" and makes it possible for the operator to apply the brakes more effectively with a given thrust upon brake pedal 15. Compounding occurs during the terminal portions of the pressure build up by thrust on pedal 15. At the end of their forward stroke the parts inside the assister occupy the position shown in Fig. 2.

If pedal 15 is now held stationary, pressures within the system become stabilized. Pressure in the brake line is maintained higher than the pressure in the master cylinder by a factor which is typically 2:1 but which for any given assister unit is determined by the ratio between the net effective areas at the ends of the differential piston and the thrust of spring 46. As an example, assume that the area of bores 30 and 31 have a ratio of 2:1 and the smaller bore is .75 square inch in area. A fluid pressure of 300 p.s.i. at the large end of the differential piston would produce a total thrust of 450 lbs. If spring 46 has a thrust of 40 lbs., the remaining 410 lbs. of thrust on the small end of the piston is supplied by the fluid at a unit pressure of approximately 545 p.s.i.

As the brakes are released by decreasing the thrust on brake pedal 15, piston 12 in the master cylinder moves to the left and it is followed by the piston assembly in the assister unit since spring 46 urges the piston assembly to the left within bores 30 and 31 of housing 18. This travel of the piston assembly is very short since flange 35a soon comes into contact with the end of cylinder 11. Spring 46 moves both the differential piston and the stem to the left as a unit; but with contact of the stem with cylinder 11, the stem can move no farther toward the left. Continued decrease in fluid pressure at the larger face of the differential piston brings about a condition in which the forces exerted on the differential piston are unbalanced, the greater force being exerted by the higher fluid pressure at the smaller end. As a consequence, the differential piston, which is movable with respect to the stem, is moved further to the left by hydraulic fluid under pressure in chamber 31. Movement of the differential piston is limited by contact of the rear end of the piston with the forward face of flange 35a. At this time, the parts inside the assister unit occupy the positions shown in Fig. 3.

It will be noticed that the movement of the piston rearwardly relative to the stationary stem has caused disengagement of flange 47 with the forward end of the piston. As a consequence, fluid passage 51 is now in free communication at its forward end with the space in bore 31 through the gap created between the end of the differential piston and flange 47, as indicated at 54. This gap opens the second fluid passage to place chamber 31 in communication with the inlet side of the piston assembly. Now fluid from chamber 31 can flow through passages 51, 45 and 50 to the inlet end of the assister unit and thence into the master cylinder. In this way pressure within the system forwardly of the assister unit is relieved to release the brakes and return the system to normal condition.

However, pressures on the two sides of the differential piston do not entirely equalize. Before the fluid pressures in bores 30 and 31 become exactly equal, spring 44 pushes the differential piston forwardly and closes the gap at 54, restoring the normally closed condition of by-pass passage 50—45—51. Thus the flange 47 serves as a valve means which is normally in contact with the end of the differential piston to close the fluid passage 51. The strength of spring 44 is selected so that the passage 51 is closed by valve 47 when the fluid pressure in chamber 31 is about 10–12 p.s.i. This maintains a desirable residual pressure in conduit 21 and motors 22, in accord with common practice. The valve at 47 performs the same function in this respect as the usual check valve at the outlet to the master cylinder, but which is omitted when the assister unit is combined with the master cylinder as in Figs. 1–3. These residual pressures have the advantage of keeping the valves closed and taking up all slack in moving parts, thus improving the operation of the brakes and avoiding any softness or "loss of pedal" when the brakes are applied by depressing pedal 15.

There is shown in Fig. 4 a variational form of the invention in which the assister unit is designed as a separate independent unit which can be sold as an accessory to be added to the hydraulic brake control systems of automobiles. When the assister is incorporated in a brake system as part of the original equipment of the car it is feasible to make its housing integral with or connected directly to the master cylinder and reservoir, in some such manner as shown in Fig. 1. However, when it is to be a separate unit, the larger end of the housing is closed by a plug 60 which has a threaded opening 61 adapted to receive a conduit (not shown) which is connected to the standard outlet of a master cylinder. Thus the opening 61 serves as the inlet to the housing to receive the fluid under pressure delivered by a master cylinder. When the assister is a separate unit, it is also preferable to provide it with one or more ports 62 closed by screws 63 in order to bleed off from the system any air which may collect in the assister unit during installation.

The construction of the piston assembly within the assister housing is essentially the same as previously described, except for certain differences which will now be pointed out. As before, stem 35 has a longitudinally extending fluid passage 38 extending entirely through it. The location of check valve 39 has been moved forward so that the valve is now located in passage 38 adjacent the forward or outlet end. The valve seat is on an integral portion of the stem rather than on a removable sleeve, as before. Otherwise, the valve 39 is constructed as before and it functions in the same manner. Spring 40 is held in the fluid passage by means of a lock ring 65 which expands into an internal groove cut in the passage.

At the rear end of the stem, flange 35c is also modified. Instead of being an integral portion of the stem, as before, it is now part of a collar which is threaded on to the end of the sleeve. It will be noted that in each construction the stem carries a flange at each end of a diameter larger than the intermediate section; and one of these flanges is made removable in order to permit assembly of the parts. The outer end of flange 35c abuts the inner face of plug 60. To prevent sealing off bore 30 at this location from entering the system, flange 35c is provided with a radial groove 35d which permits fluid entering through passage 61 to flow radially outward through groove 35d into the bore 30 to apply fluid pressure to the differential piston 32.

One other significant change is the relocation of the second fluid passage which by-passes check valve 39. In this form of the invention the second passage is a short radial passage 67 through the stem which communicates at its inner end with longitudinal passage 38. This passage 67 is located adjacent flange 47a. As does flange 47 in the earlier described construction, flange 47a engages the forward end of the differential piston to limit forward travel of the differential piston under the influence of spring 44. In this position the outer end of passage 67 is closed by the differential piston covering the passage, the passage being adjacent flange 47a and thus within the bore 34 extending through the differential piston when the piston is advanced. Flange 47a, like flange 47, has the function of a stop means limiting relative travel of the differential piston and stem; but the actual valve means closing the secondary by-pass fluid passage is a portion of the differential piston. The passage is opened and closed by relative movement of the stem and the differential piston, as in the form of Fig. 1, so that the function of the passage is the same as before. Passage 67 differs from the corresponding fluid passage 50—45—51 of the form of my invention first described in that it communicates with longitudinal passage 38. Thus a portion of passage 38 is used to complete the path for return flow of fluid from bore 31 to the inlet end of the assister when pressure is being released and valve 39 is closed.

Spring 44 is shown; but in this form of the invention this spring may be omitted if desired. Without spring 44, the relative value of fluid pressures at the two faces of piston 32 depends entirely on the ratio of the effective end areas of the piston assembly, or the areas of bores 30 and 31. The ordinary master cylinder contains a check valve at its outlet end designed to close when fluid pressure on the brake side of the valve is about 4–6 p.s.i. This pressure is adequate to move the differential piston to a position closing port 67. The assister unit is so designed that, when valve 67 closes, the pressure in bore 31 is approximately twice that at the other end of the differential piston. The effect of spring 44, if used, is to raise the residual pressure in bore 31 since the port 67 is closed sooner than without the spring. It will be noted that at all times, except during the initial stage of applying the brakes, valve 39 is closed and the unit fluid pressure in chamber 31 and conduit 21 is greater than the unit pressure of fluid in bore 30 applied to the larger end of the piston assembly.

From the above description of the operation of the embodiment illustrated in Figs. 1–3 the operation of the form of the invention illustrated in Fig. 4 will be apparent. Accordingly, it will not be described in detail.

From the foregoing description it will be apparent that various changes in the design and detailed arrangement of the component parts of my assister unit may occur to persons skilled in the art but without departing from the spirit and scope of my invention. Accordingly, it is to be understood that the foregoing description is considered as being illustrative of, rather than limitative upon, the invention as defined by the appended claims.

I claim:

1. In a fluid pressure assister for a hydraulic control system having a housing with an inlet adapted to be connected to a source of fluid under pressure and an outlet adapted to be connected to a motor device, the combination comprising: a differential piston movable within the housing and having two spaced faces of different effective areas, the face of larger area being in fluid communication with the housing inlet and the face of smaller area being in fluid communication with the housing outlet; means defining a first fluid passage extending through the differential piston to establish fluid communication between said inlet and said outlet; check valve means in the fluid passage for closing the passage to fluid flow from the outlet toward the inlet but opening in response to excess fluid pressure applied through the inlet; means defining a second fluid passage by-passing said check valve; a second valve means controlling fluid flow through the second passage; spring means normally urging the second valve means to a closed position; and means responsive to fluid pressure at the outlet side of the differential piston to open the valve when fluid pressure at the outlet side exceeds the fluid pressure at the inlet side by a predetermined amount.

2. In a fluid pressure assister for a hydraulic control system having a housing with an inlet adapted to be connected to a source of fluid under pressure and an outlet adapted to be connected to a motor device, the combination comprising: a differential piston movable within the housing and having two spaced faces of different effective areas, the face of larger area being in fluid communication with the housing inlet and the face of smaller area being in fluid communication with the housing outlet; a stem slidably mounted on the piston to move axially of the piston relative thereto and defining a first fluid passage extending through the stem and the differential piston to establish fluid communication between said inlet and said outlet; check valve means in the first fluid passage for closing the passage to fluid flow from the outlet toward the inlet but opening in response to excess fluid pressure applied through the inlet; said stem cooperating with the piston to define a second fluid passage by-passing said check valve, said stem and piston being relatively movable between a first position in which the second passage is closed and a second position in which the second passage is open to permit fluid flow from the outlet side to the inlet side of the piston, the piston being movable relative to the stem to said second position in response to a predetermined excess of fluid pressure at the outlet side of the piston.

3. A fluid pressure assister as claimed in claim 2 that also includes spring means urging the piston and stem normally to occupy the first position.

4. In a fluid pressure assister for a hydraulic control system having a housing with an inlet adapted to be connected to a source of fluid under pressure and an outlet adapted to be connected to a motor device, the combination comprising: a differential piston assembly movable within the housing and having two spaced faces of different effective areas, the face of larger area being in fluid communication with the housing inlet and the face of smaller area being in fluid communication with the housing outlet, said assembly defining a first and a second fluid passage extending through the differential piston to establish fluid communication between said inlet and said outlet; and check valve means in the first fluid passage for closing the first passage to fluid flow from the outlet toward the inlet but opening in response to excess fluid pressure applied through the inlet; said piston assembly including a piston and a stem slidably mounted on the piston for limited axial movement of the piston and stem relative to each other between a first position in which the second passage is closed and a second position in which the second passage is open to permit fluid flow through the passage from the outlet toward the inlet, said piston being movable relative to the stem to the second position in response to a predetermined excess of fluid pressure at the outlet side of the piston.

5. A fluid pressure assister as claimed in claim 4, that also includes a single spring means at the outlet end of the housing urging the piston assembly toward the inlet end of the housing.

6. A fluid pressure assister as claimed in claim 5 that also includes spring means bearing against the piston and the stem to urge them toward said first position.

7. A fluid pressure assister as in claim 4 in which the second fluid passage opens at one end into the first passage at the inlet side of the check valve and the piston is adapted to close the second passage.

8. In a fluid pressure assister for a hydraulic control system having a housing with an inlet adapted to be connected to a source of fluid under pressure and an outlet adapted to be connected to a motor device, the combination comprising: a differential piston movable within the housing and having two spaced faces of different effective areas, the face of larger area being in fluid communication with the housing inlet and the face of smaller area being in fluid communication with the housing outlet; a hollow stem slidably mounted in the piston for relative axial movement, said stem providing a first fluid passage establishing fluid communication between said inlet and said outlet; a first valve means in said first passage, said valve means including means biasing the valve element to a closed position but yielding to excess fluid pressure on the inlet side to open the valve; said piston and stem cooperating to define a second fluid passage establishing fluid communication between said inlet and said outlet, and said stem including second valve means adapted to close the second fluid passage by relative movement of the piston and stem; spring means bearing against the stem and piston to urge them normally to relative positions closing said second fluid passage and yielding to excess fluid pressure at the outlet side of the piston to move the piston and stem relative to each other to open the second fluid passage; and a return spring bearing against the stem and the outlet end of the housing to urge the stem and piston toward the inlet end of the housing.

References Cited in the file of this patent

UNITED STATES PATENTS

| | | |
|---|---|---|
| 2,190,238 | Lepersonne | Feb. 13, 1940 |
| 2,340,113 | Dodge | Jan. 25, 1944 |
| 2,372,015 | Rockwell | Mar. 20, 1945 |